Sept. 21, 1971 W. B. BROWN 3,606,895
VEHICLE WASHER AND DRIER
Filed April 23, 1970 5 Sheets-Sheet 1

INVENTOR.
WILLIAM B. BROWN
BY
Norman G. Steanson Jr.
ATTORNEY

Sept. 21, 1971     W. B. BROWN     3,606,895

VEHICLE WASHER AND DRIER

Filed April 23, 1970     5 Sheets-Sheet 2

INVENTOR.
WILLIAM B. BROWN
BY
Norman G. Stearson Jr.
ATTORNEY

Sept. 21, 1971     W. B. BROWN     3,606,895
VEHICLE WASHER AND DRIER

Filed April 23, 1970     5 Sheets-Sheet 4

INVENTOR.
WILLIAM B. BROWN
BY
Norman D. Steanson Jr.
ATTORNEY

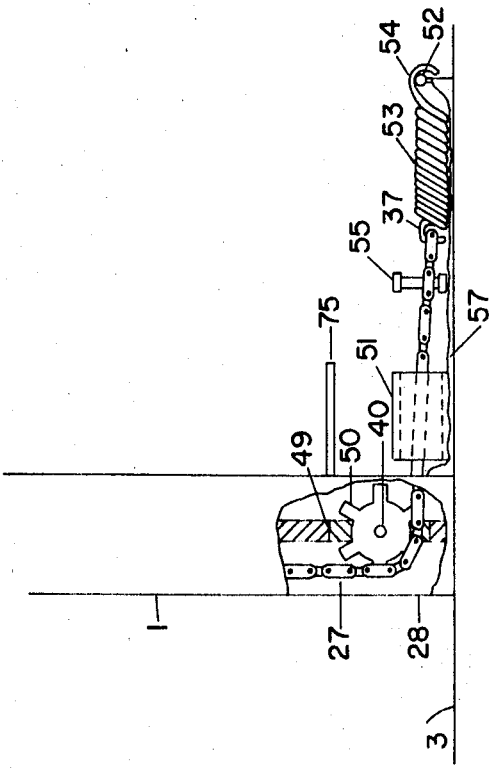
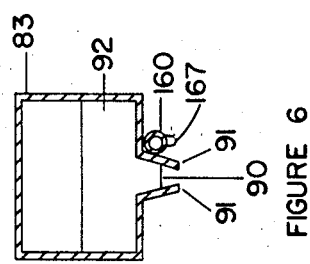
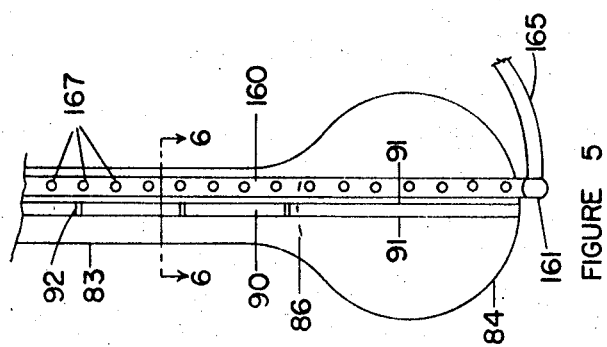

_United States Patent Office_

3,606,895
Patented Sept. 21, 1971

3,606,895
VEHICLE WASHER AND DRIER
William Bithol Brown, Granby, Mo.
(522 W. 39th St., Topeka, Kans. 66609)
Filed Apr. 23, 1970, Ser. No. 31,263
Int. Cl. B60s 3/04
U.S. Cl. 134—58R   6 Claims

ABSTRACT OF THE DISCLOSURE

A pair of arcuate beams mounted on a surface are provided. The beams define a vehicle washing position. The beams substantially follow the top contour of the vehicle to be washed and dried. Without the drying mode, an inverted U-shaped spray unit is provided and movably mounted to the tops of the beams by rollers mounted to roll on top of the beams and rotatably mounted on a shaft that is rotatably mounted on the spray unit top. A pair of chains are mounted on the tops of the beams. A plurality of idler sprockets are rotatably mounted to the top sides of the spray unit. A pair of drive sprockets are mounted on the ends of the shaft. The chains are interwoven through the drive and idler sprockets so that when the drive sprockets are rotated by a reversible electric motor operatively connected to the shaft the spray unit is moved back and forth over the vehicle to be washed. The spray unit will substantially follow the contours of the vehicle to be washed. With the drying mode, an inverted U-shaped drier unit is provided. Air blowers are mounted to the bottoms of the drier unit air ducts. In this mode, spray pipes, idler sprockets, shaft and electric motor are mounted to the drier unit air ducts instead of the spray unit and the vehicle can be dried as well as washed.

BACKGROUND OF THE INVENTION

This invention relates to vehicle washers and driers.

A problem in the prior art has been that vehicle washers that followed the top, side and end contours of the vehicle to be washed had to be operated by manual or complicated means. Another problem in the prior art was that the vehicle drying apparatus did not follow the top, side and end contours of the vehicle to be dried and had to be operated by manual means. Also, the prior art machines were complicated and expensive.

A problem solved by this invention is that a drier is provided that is operated by power rather than manual means.

Another problem solved by this invention is that a washer and drier is provided in which the fluid spray and drying air blast substantially follow the top, side and end contours of the vehicle to be washed by power means so that the spray curtain and air blast impinge on the vehicle in a substantially perpendicular direction thus promoting maximum effective cleaning and drying operation in a new and improved manner.

Another problem solved by this invention is that a washer and drier is provided in which the spray curtain and air blast are operated by power means and stay substantially near the vehicle top, side and end surfaces so that the spray curtain and air blast reach the vehicle surfaces with optimum effective force in a new and improved manner.

Another problem solved by this invention is that a vehicle washer and drier is provided that is simple, easy to construct, and highly effective in a new and improved manner.

SUMMARY OF THE INVENTION

The invention utilizes two arcuate beams mounted on a surface and defining a vehicle washing position. The top contours of the beams substantially follow the top contour of the vehicle to be washed. An inverted U-shaped spray unit is provided and movably mounted to the tops of the beams by rollers that roll on top of the beams and that are rotatably mounted to a shaft that is rotatably mounted to the top of the spray unit. A plurality of idler sprockets are mounted to the top sides of the spray unit. A pair of drive sprockets are mounted to the ends of the shaft. A pair of drive chains are mounted to the beams at the beam ends and lay on top of the beams and are interwoven through the idler sprockets and drive sprockets so that when the drive sprockets are rotated by a reversible electric motor operatively connected to the shaft, the spray unit is moved over the vehicle to be washed. The spray unit substantially follows the contours of the vehicle to be washed.

If a washer and drier is desired, an inverted U-shaped drier unit is provided that has a pair of blowers operatively connected to the bottom air ducts of the drier unit. The washer and drier is constructed and operates similarly to the washer alone except a spray pipe is mounted to the drier unit and the shaft, electric motor and idler sprockets are mounted to the drier unit instead of the spray unit.

BRIEF DESCRIPTION OF THE DRAWINGS

Referring to the drawings:
FIG. 5 is a side elevation view of a lower portion of the inverted U-shaped drier unit and spray pipe;
FIG. 6 is an enlarged sectional view as seen from the line 6—6 of FIG. 5;
FIG. 7 is an enlarged side elevation view, partly broken away, showing the resilient means for connecting the ends of the chains to the ends of the beams on both the washer and washer and drier.

DESCRIPTION OF THE PREFERRED EMBODIMENT

Figure 1:
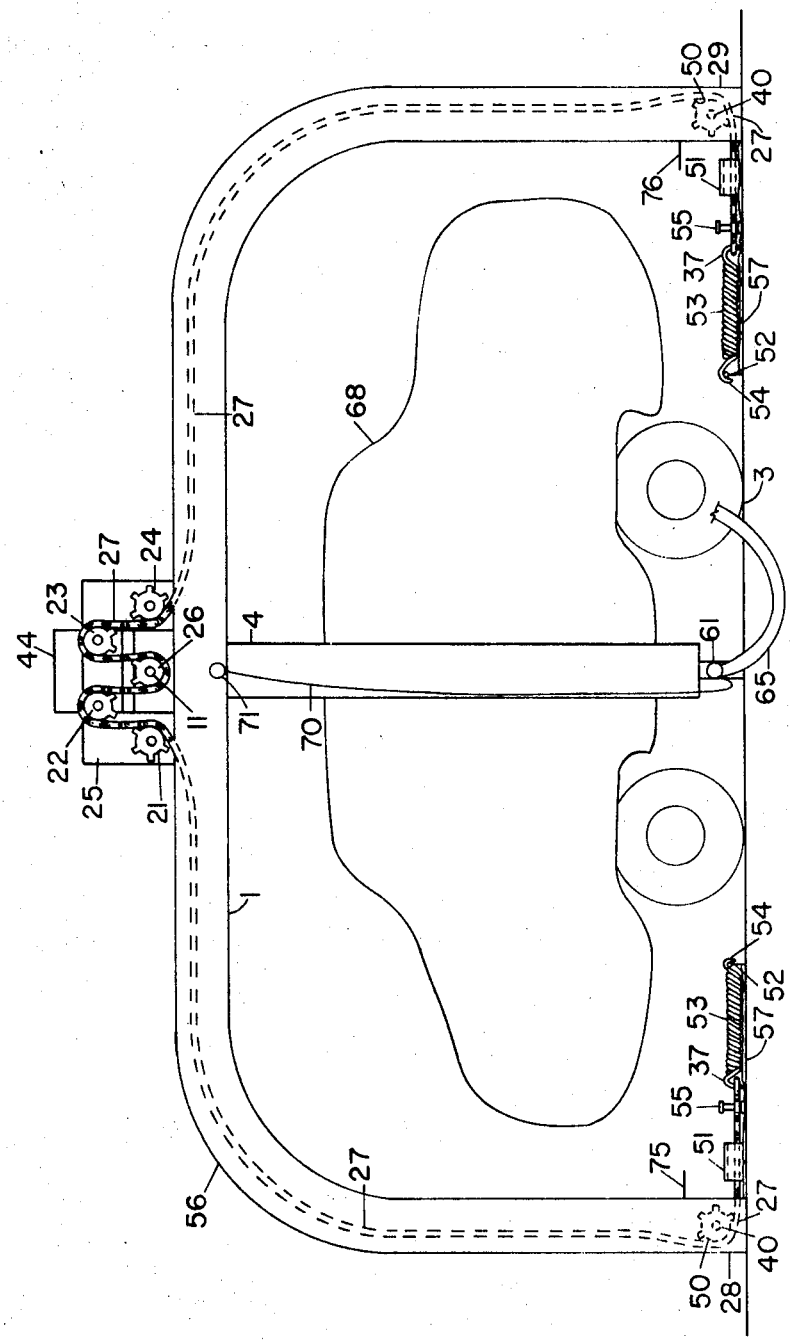
FIG. 1 is a side elevation view of the vehicle washer.
Figure 2:
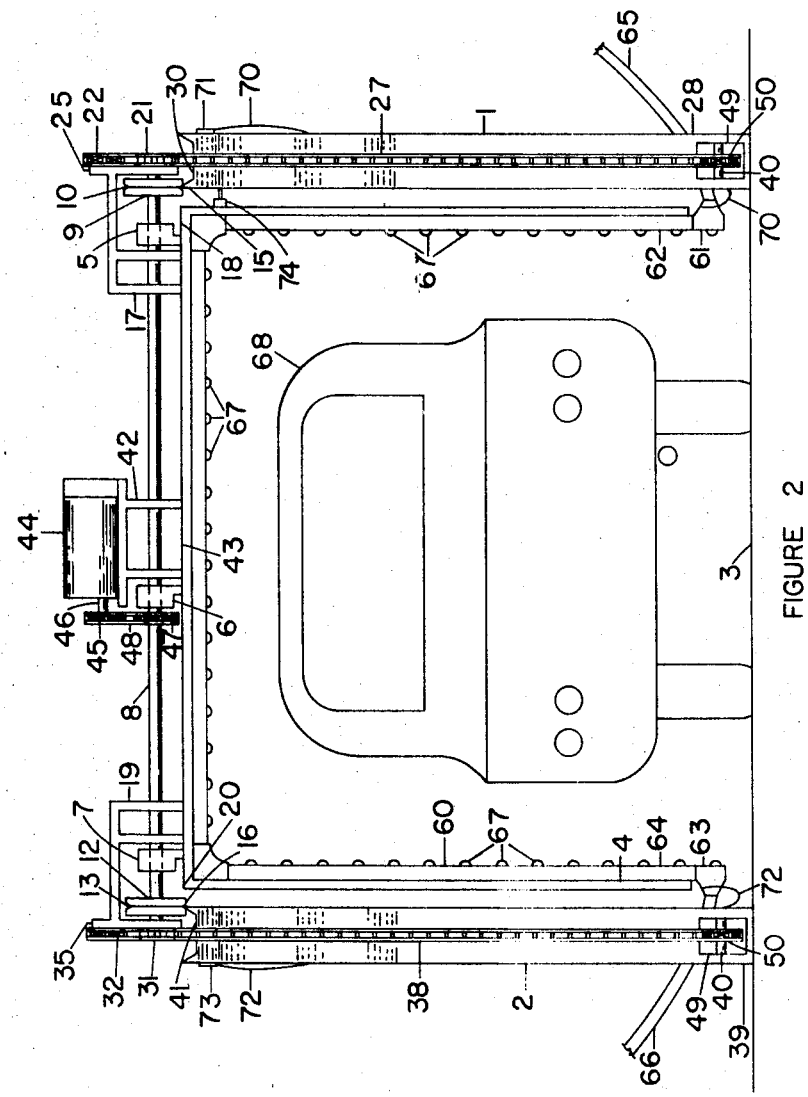
FIG. 2 is a front elevation view of the vehicle washer.

Referring in greater detail to FIG. 1, FIG. 2 and FIG. 7, the vehicle washer alone will be described first.

A first arcuate I beam 1 and second arcuate I beam 2 are provided. The first arcuate I beam 1 and second arcuate I beam 2 are mounted to a surface 3 and define a vehicle washing position and have similar contours that are substantially the same as the top surface of the vehicle 68 to be washed.

An inverted U-shaped frame 4 is provided. A first bearing 5, second bearing 6 and third bearing 7 are mounted, as by welding, to the frame top 43. A shaft 8 is rotatably mounted in and through first bearing 5, second bearing 6 and third bearing 7. A first grooved roller 9 having a first groove 10 is rotatably mounted to the shaft 8 substantially near the first shaft end 11. A second grooved roller 12 having a second groove 13 is rotatably mounted substantially near the second shaft end (not shown). The first grooved roller 9 and second grooved roller 12 are so mounted on shaft 8 that first groove 10 rests on first I beam inside top edge 15 and second groove 13 rests on second I beam inside top edge 16. Thus the frame 4 is movably mounted on first I beam 1 and second I beam 2.

A first bracket 17 is mounted substantially adjacent first frame corner 18. A second bracket 19 is mounted substantially adjacent second frame corner 20. A first idler sprocket 21, second idler sprocket 22, third idler sprocket 23 and fourth idler sprocket 24 are rotatably mounted on a first bracket face 25 so that idler sprockets 21, 22, 23 and 24 define the corners of an isosceles trapezoid and lie in substantially the same plane. Idler sprockets 21, 22, 23 and 24 could also define the corners of an appropriate rectangle or square. A first drive sprocket 26 is rigidly mounted to first shaft end 11. First drive sprocket 26 lies between and in the same plane as first idler sprocket 21 and fourth idler sprocket 24. A first drive chain 27 is resiliently connected to the first I beam first end 28 and first I beam second end 29 lies on first I beam web 30 and is operatively interwoven through idler sprockets 21, 22, 23 and 24 and first drive sprocket 26 as will be described. First drive chain 27 comes up from first I beam first end 28 on first I beam web 30 and goes under and is operatively connected to first idler sprocket 21, then up and over second idler sprocket 22, then down and under first drive sprocket 26, then up and over third idler sprocket 23 and then down and under fourth idler sprocket 24 and then on down first I beam web 30 and is then resiliently connected to first I beam second end 29.

Similarly, a fifth idler sprocket 31, sixth idler sprocket 32, seventh idler sprocket (not shown) and eighth idler sprocket (not shown) are rotatably mounted to second bracket face 35 so that idler sprockets 31, 32, and seventh idler sprocket (not shown) and eighth idler sprocket (not shown) define the corners of an isosceles trapezoid and lie substantially in the same plane just as idler sprockets 21, 22, 23 and 24 are mounted to first bracket face 25. Idler sprockets 31, 32, seventh idler sprocket (not shown) and eighth idler sprocket (not shown) could also define the corners of an appropriate rectangle or square. A second drive sprocket (not shown) is rigidly mounted to the second shaft end (not shown). A second drive chain 38 is resiliently connected to the second I beam first end 39 and the second I beam end (not shown) and lies on second I beam web 41. Second drive chain 38 is interwoven through fifth idler sprocket 31, sixth idler sprocket 32, seventh idler sprocket (not shown) and eighth idler sprocket (not shown) and second drive sprocket (not shown) the same way that first drive chain 27 is interwoven through idler sprockets 21, 22, 23 and 24 and first drive sprocket 26. Since the drive means is the same on both sides it is thought necessary to illustrate only one side.

A motor mount 42 is mounted to the frame top 43 as by welding. A reversible electric drive motor 44 is mounted to the motor mount 42. A third drive sprocket 45 is mounted to the motor drive shaft 46. A fourth drive sprocket 47 is mounted to the shaft 8 and a third drive chain 48 operatively connects third drive sprocket 45 and fourth drive sprocket 47 so that when electric motor 44 is operated, shaft 8 is driven in a direction of rotation dependent on the direction of rotation of the reversible electric motor 44.

FIG. 7 illustrates the means by which first drive chain 27 is connected to first I beam first end 28. First drive chain 27 is connected to first I beam second end 29 and second drive chain 38 is connected to second I beam first end 39 and second I beam second end (not shown) the same way as first drive chain 27 is connected to first I beam first end 28. Hence, since all four connections are the same only the first drive chain 27 connection to first I beam first end 28 will be described. The similar parts of the other three resilient connections are numbered the same as the similar parts of the described connections. A first sprocket opening 49 is cut or formed in first I beam web 30 and substantially near the first I beam first end 28. A ninth idler sprocket 50 is rotatably mounted in first sprocket opening 49 on second shaft 40. A first angle iron 57 is mounted as by welding to the first I beam first end 28 and extends toward the first I beam second end 29. A length of first pipe 51 is welded in and to the angle iron 57 near the first I beam first end 28. A first pin 52 is welded across the end of first angle iron 57. A first spring 53 has a first hook 54 that is hooked over and to first pin 52. First drive chain 27 comes down first I beam 1, operatively around and under ninth idler sprocket 50, through first pipe 51 and is hooked to a second hook 37 of first spring 53. A nut and bolt 55 is mounted through a link of first drive chain 27 to limit the movement of first drive chain 27 back through first pipe 51. It can now be seen that first drive chain 27 is resiliently connected to that when a greater force is applied to first drive chain 27, as when frame top 43 goes around first I beam first curve 56, first spring 53 will expand to keep first drive chain 27 taut.

Referring again to FIG. 1 and FIG. 2, an inverted U-shaped spray pipe 60 having the same contour as the frame 4 is mounted to the frame 4 as by welding. A first T joint 61 is threadedly mounted to a spray pipe first end 62 and a second T joint 63 is threadedly mounted to spray pipe second end 64. A first flexible hose 65 is operatively connected to first T joint 61 and a second flexible hose 66 is operatively connected to second T joint 63. First flexible hose 65 and second flexible hose 66 are long enough to allow frame 4 to move to the extreme positions on first arcuate I beam 1 and second arcuate I beam 2. A plurality of nozzles 67 are operatively mounted to spray pipe 60. Nozzles 67 are so mounted on spray pipe 60 that when fluid under pressure is pumped into first flexible hose 65 and second flexible hose 66 the fluid leaving nozzles 67 strikes a vehicle to be washed substantially normal to the vehicle 68 surfaces.

A first flexible strand 70 is bolted by bolt 71 to substantially first arcuate I beam 1 middle at one end. The other end of first flexible strand 70 is connected, as by tying, to first T joint 61. Similarly a second flexible strand 72 is bolted by bolt 73 to substantially second arcuate I beam 2 middle at one end. The other end of second flexible strand 72 is connected, as by tying, to second T joint 63. First flexible strand 70 and second flexible strand 72 are just long enough so that as frame 4 and spray pipe 60 move around the curves of first arcuate I beam 1 and move toward the surface 3, the first flexible strand 70 and second flexible strand 72 become taut and prevent the first T joint 61 and second T joint 63 from dragging on the surface 3.

A reversing switch 74 is mounted adjacent first frame corner 18. Reversing switch 74 is electrically connected to reversible electric motor 44. A first switching rod 75 is mounted adjacent first I beam first end 28. The reversing switch 74 and first switching rod 75 are so mounted that when first frame corner 18 reaches first I beam first end 28 reversing switch 74 strikes first switching rod 75 which flips reversing switch 74 into an opposite position which reverses the direction of rotation of reversible electric motor 44 and causes frame 4 and spray pipe 60 to move back up first I beam 1 and second I beam 2. A second switching rod 76 is mounted on first I beam second end 29 to flip reversing switch 74 to reverse reversible electric motor 44 when first frame corner 18 reaches first I beam second end 29 which causes reversible electric motor 44 to gain reverse direction of rotation to move frame 4 and spray pipe 60 in the opposite direction.

The operation of the washer alone will now be described. First, the reversible electric motor 44 is energized. Reversible electric motor 44 drives shaft 8 causing first drive sprocket 26 and second drive sprocket (not shown) to rotate and to move along first drive chain 27 and second drive chain 38, respectively, toward first I beam first end 28 and second I beam first end 39. As the reversible electric motor 44 is started, washing fluid under pressure is supplied to first flexible hose 65 and second flexible hose 66 and causing washing fluid to come out nozzles 67 and form a spray curtain substantially normal to the vehicle 68 surfaces. Frame 4 and spray pipe 60 move along first I beam 1 and second I beam 2. As frame 4 and spray pipe 60 move along, first flexible strand 70 and second flexible strand 72 become taut before first T joint 61 and second T joint 63 can drag on surface 3. Frame 4 and spray pipe 60 move on toward first I beam first end 28 and second I beam first end 39 substantially following the contour of the vehicle 68 to be washed until reversing switch 74 is flipped into the reverse position by first switching rod 75. This reverses the direction of rotation of reversible electric motor 44 causing frame 4 and spray pipe 60 to move back up first I beam 1 and I beam 2 and toward first I beam second end 29. As the frame 4 and spray pipe 60 proceed toward first I beam second end 29 and second I beam second end (not shown) first flexible strand 70 and second flexible strand 72 again become taut in time to prevent first T joint 61 and second T joint 63 from dragging on the surface 3. As frame 4 and spray pipe 60 reach first I beam second end 29, reversing switch 74 is flipped into the opposite position by second switching rod 76 causing the reversible electric motor 44 to again reverse direction and move the frame 4 and spray pipe 60 back up first I beam 1 and second I beam 2. When frame 4 and spray pipe 60 reach the middle of first I beam 1 and second I beam 2 one cycle is completed. Any desired combination of cycles could be used as, for example, two cycles using detergent wash water, and two cycles using rinse water. Thus, the vehicle 68 is cleaned by fluid impinging close to, and substantially normal to, the surfaces of the vehicle 68.

The washer and drier combination will now be described in detail. Referring to FIG. 3, FIG. 4, FIG. 5 and FIG. 6. The washer and drier is very similar to the washer alone, differing only in the addition of a drying unit. A first arcuate I beam 80 and second arcuate I beam 81 are provided that have a contour substantially the same as the vehicle 82 to be washed and dried and are mounted on surface 79 and define a vehicle washing and drying position.

An inverted U-shaped drying duct 83 is provided. The drying duct 83 has a first circular bottom 84 and second circular bottom 85 having a first circular opening 86 and second circular opening 87, respectively. A first fan 88 is operatively mounted to first circular opening 86 as by welding. A second fan 89 is operatively mounted to second circular opening 87 as by welding. First fan 88 and second 89 can be any conventional fan that will supply the air flow required to dry the vehicle 82 in a reasonable length of time. The drying duct 83 has an air outlet 90 defined by outwardly struck lips 91 on its inner periphery for providing drying air to the vehicle 82. A plurality of turning vanes 92 are mounted, as by welding, to the inside surfaces of the drying duct 83 to cause the drying air to be directed normal to the surfaces of the vehicle 82 to be dried. A first motor frame 93 is mounted to first fan 88. A first fan motor 94 is mounted to first motor frame 93 and is operatively connected to drive first fan 88 by means of first fan motor pulley 95 and first belt 96. Similarly, a second motor frame 97 is mounted to second fan 89. A second fan motor 98 is mounted to second motor frame 97 and is operatively connected to drive second fan 89 by means of second fan motor pulley 98 and second belt 99.

A first bearing 102, second bearing 103 and third bearing 104 are mounted, as by welding, in axial alignment on drying duct top 105. A shaft 106 is rotatably mounted in and through first bearing 102, second bearing 103 and third bearing 104. A first grooved roller 107 having a first groove 108 is rotatably mounted to the shaft 106 substantially near the first shaft end 109. A second grooved roller 110 having a second groove 111 is rotatably mounted to shaft 106 substantially near the second shaft end (not shown). The first groove roller 107 and second grooved roller 110 are so mounted on shaft 106 so that first groove 108 rests and can roll on first I beam inside top edge 112 and second groove 111 rests, and can roll on second I beam inside top edge 113. Thus, the drying duct 83 is movably mounted on first I beam 80 and second I beam 81.

A first bracket 114 is mounted substantially adjacent first drying duct corner 115. A second bracket 116 is mounted substantially adjacent second drying duct corner 117. A first idler sprocket 121, second idler sprocket 122, third idler sprocket 123 and fourth idler sprocket 124 are rotatably mounted on a first bracket face 125 so that idler sprockets 121, 122, 123 and 124 define the corners of an isosceles trapezoid and lie in substantially the same plane. Idler sprockets 121, 122, 123 and 124 could also define the corners of an appropriate rectangle or square. A first drive sprocket 126 is rigidly mounted to the first shaft end 109. First drive sprocket 126 lies between and in the same plane as first idler sprocket 121 and fourth idler sprocket 124. A first drive chain 127 is resiliently connected to the first I beam first end 129 and first I beam second end 130 and lies on first I beam web 131 and is operatively interwoven through idler sprockets 121, 122, 123 and 124 and first drive sprocket 126 as will be described. First drive chain 127 comes up from first I beam first end 129 on first I beam web 131 and goes under and is operatively connected to first idler sprocket 121, then up and over second idler sprocket 122 and then down and under first drive sprocket 126, then up and over third idler sprocket 123 and then down and under fourth idler sprocket 124 and then down first I beam web 131 to a resilient connection on first I beam second end 130.

The drive connection means on both sides of the washer and drier are similar so it is thought necessary to illustrate only one side. Thus, a fifth idler sprocket 133, sixth idler sprocket 134, seventh idler sprocket (not shown) and eighth idler sprocket (not shown) are rotatably mounted to second bracket face 135 so as to lie in substantially the same plane and so as to define the corners of an isosceles trapezoid just as idler sprockets 121, 122, 123 and 124 are mounted to first bracket face 125. Fifth idler sprocket 133, sixth idler sprocket 134, seventh idler sprocket (not shown) and eighth idler sprocket (not shown) could also define the corners of an appropriate rectangle or square. A second drive sprocket (not shown) is rigidly mounted to second shaft end (not shown). A second drive chain 136 resiliently connected to second I beam first end 137 and second I beam second end (not shown) and lies on second I beam web 138 and is operatively interwoven through fifth idler sprocket 133, sixth idler sprocket 134, seventh idler sprocket (not shown), eighth idler sprocket (not shown) and second drive sprocket (not shown) the same way that first drive chain 127 is interwoven through idler sprockets 121, 122, 123, 124 and first drive sprocket 126.

A motor mount 140 is mounted to the drying duct top 105 as by welding. A reversible electric drive motor 141 is mounted to motor mount 140. A third drive sprocket 142 is mounted to reversible electric motor drive shaft 143. A fourth drive sprocket 144 is mounted to shaft 106 and a third drive chain 145 is operatively connected to third drive sprocket 142 and fourth drive sprocket 144 so that when reversible electric drive motor 141 is energized and operated, shaft 106 is driven in a direction of rotation dependent on the direction of rotation of reversible electric motor 141.

Figure 3:
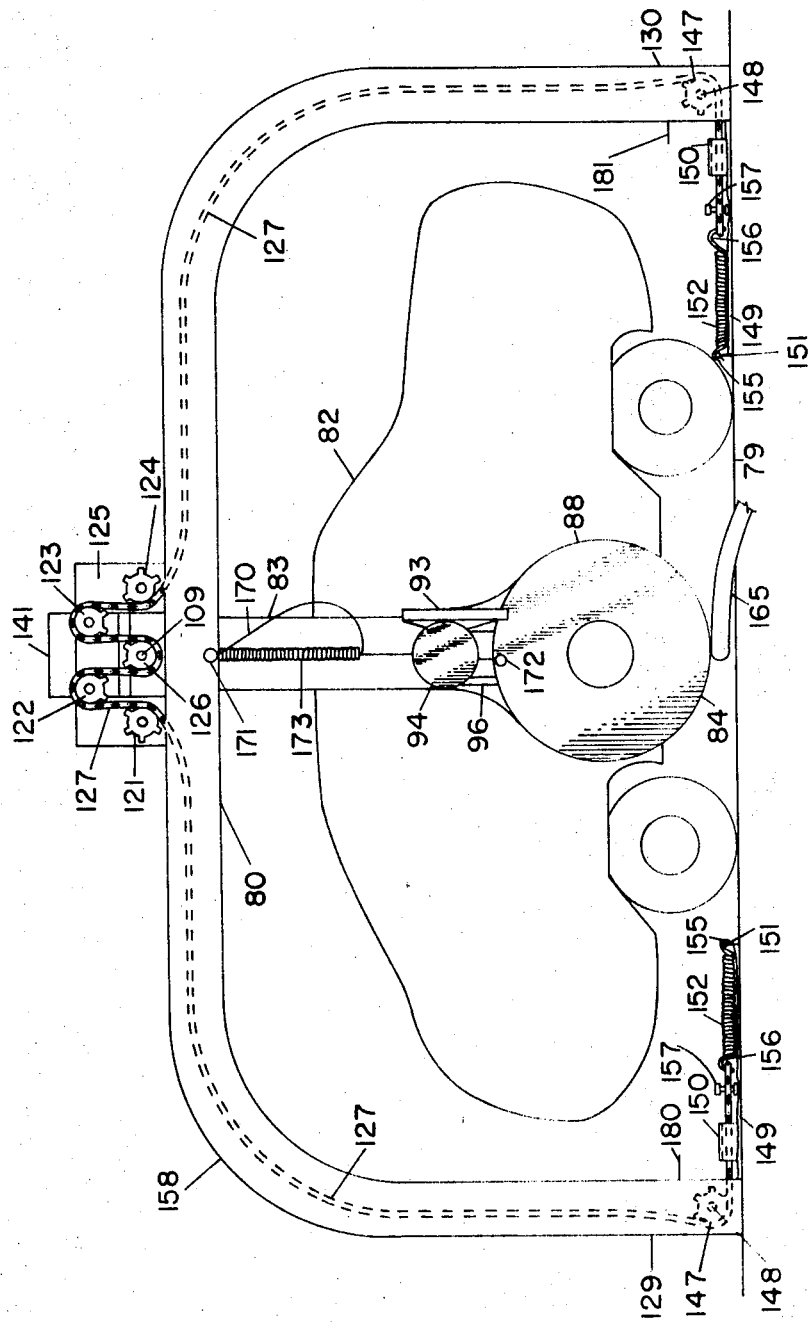
FIG. 3 is a side elevation view of the vehicle washer and drier.
Figure 4:
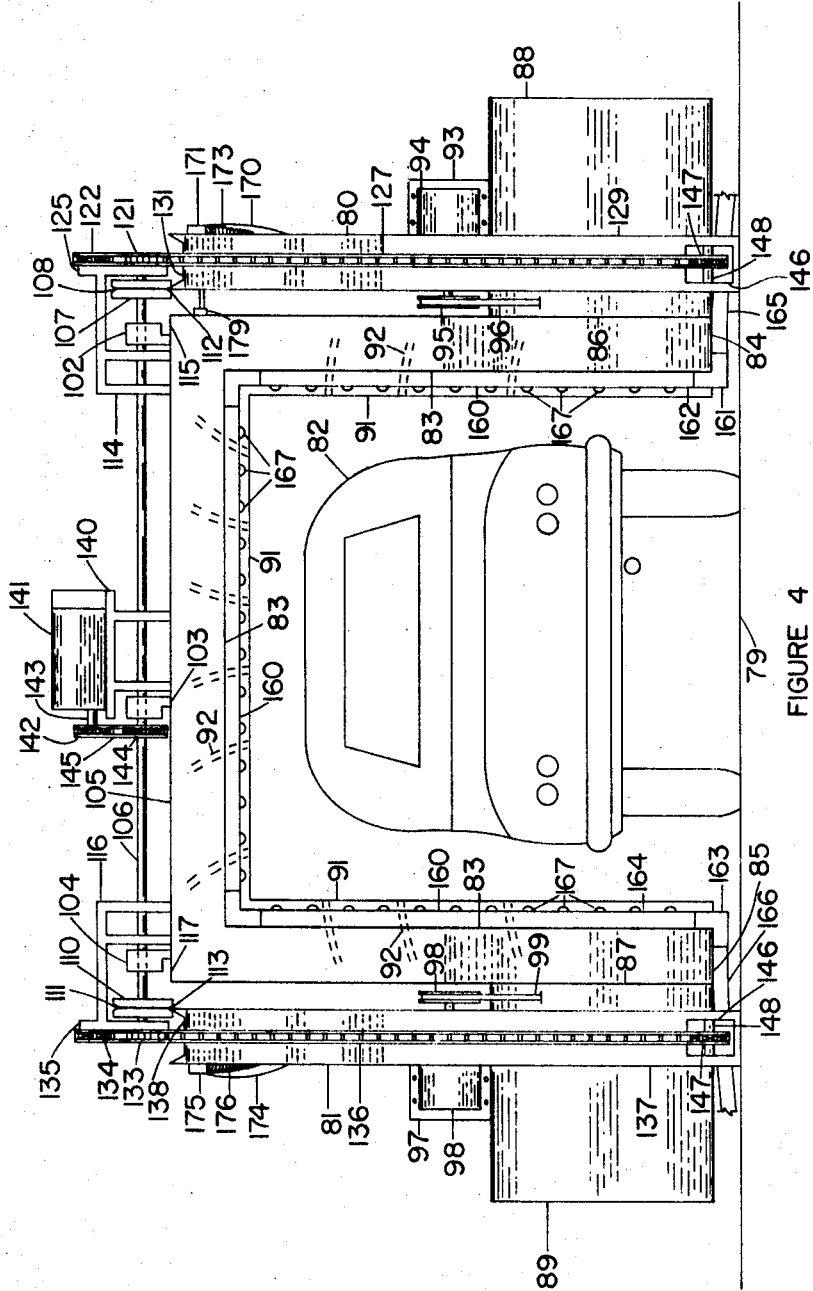
FIG. 4 is a front elevation view of the vehicle washer and drier.

The resilient connection means for the ends of first drive chain 127 and second drive chain 136 as shown in FIG. 3 and FIG. 4 will now be described. All four ends are connected similarly so similar numbers are used for similar parts on all four resilient connections and only the means for connecting first drive chain 127 to first I beam first end 129 will be described in detail. Also, refer to FIG. 7 for similar resilient connection means. A first sprocket opening 146 is cut or formed in first I beam web 131 substantially near first I beam first end 129. A ninth idler sprocket 147 is rotatably mounted on second shaft 148 in first sprocket opening 146. A first angle iron 149 is welded to first I beam first end 129 and extends toward first I beam second end 130. A length of first pipe 150 is welded in and on first angle iron 149 near first I beam first end 129. A first pin 151 is welded across the end of first angle iron 149. A first spring 152 has a first hook 155 that is hooked over first pin 151. First drive chain 127 comes down first I beam 80, operatively around and under ninth idler sprocket 147, through first pipe 150 and is hooked to a second hook 156 of first spring 152. A nut and bolt 157 is bolted through a link of first drive chain 127 to limit the movement of first drive chain 127 back through first pipe 150. Thus it can be seen that first drive chain 127 is resiliently connected so, that when a greater force is applied to first drive chain 127, as when drying duct top 105 goes around first I beam first corner 158, first spring 152 will expand to keep first drive chain 127 from breaking but will keep first drive chain 127 taut.

An inverted U-shaped spray pipe 160 having the same contour as the inside periphery of the drying duct 83 is mounted, as by welding, to the inside periphery of the drying duct 83. A first elbow 161 is threadedly connected to spray pipe first end 162 and a second elbow 163 is threadedly connected to spray pipe second end 164. A first flexible hose 165 is operatively connected to first elbow 161 and a second flexible hose 166 is operatively connected to second elbow 163. The first flexible hose 165 and second flexible hose 166 are long enough to allow drying duct 83 and spray pipe 160 to move to the extreme positions on first I beam 80 and second I beam 81 during operation of the washer and drier. A plurality of nozzles 167 are operatively connected to spray pipe 160. Nozzles 167 are so mounted on spray pipe 160 that when fluid is pumped under pressure into first flexible hose 165 and second flexible hose 166 the fluid leaving the nozzles 167 strikes the vehicle 82 substantially normal to the vehicle 82 surfaces.

A first flexible strand 170 is connected at one end by bolt 171 to first arcuate I beam middle 80 and is connected by bolt 172 to the top of first fan 88 at the other end. A second spring 173 is also connected at one end to bolt 171 and is connected, as by tying, to the first flexible strand 170 about one half of the distance down first flexible strand 170. The second spring 173 serves to hold first flexible strand 170 up to keep first flexible strand 170 from tangling with first fan motor pulley 95 and first belt 96. Similarly, a second flexible strand 174 is connected by bolt 175 to the second arcuate I beam 81 middle at one end and by a bolt (not shown) to the top of second fan 89 at the other end (not shown). A third spring 176 is also connected at one end to bolt 175 and to second flexible strand 174, as by tying, about one half of the way down second flexible strand 174 at the other end (not shown). The third spring 176 serves to hold second flexible strand 174 up and keeps second flexible strand 174 from tangling with second fan motor pulley 98 and second belt 99. First flexible strand 170 and second flexible strand 174 are just long enuoght so that when drying duct 83 and spray pipe 160 go around the curves of first I beam 80 and second I beam 81 and proceed toward surface 79 first flexible strand 170 and second flexible strand 174 become taut and prevent first elbow 161 and second elbow 163 from dragging on surface 79.

A reversing switch 179 is mounted on drying duct 83 adjacent first drying duct corner 115. Reversing switch 179 is electrically connected to reversible electric motor 141. A first switching rod 180 is mounted to first I beam first end 129 and a second switching rod 181 is mounted to first I beam second end 130. Reversing switch 179 and first switching rod 180 are so mounted that when drying duct 83 and first drying duct corner 115 reach first I beam first end 129 first switching rod 180 strikes and flips reversing switch 179 causing reversible electric motor 141 to reverse direction of rotation and move drying duct 83 in the opposite direction back up first I beam 80. Similarly, second switching rod 181 is so mounted that when drying duct 83 and first drying duct corner 115 reach first I beam second end 130 reversing switch 179 strikes second switching rod 181 and flips reversing switch 179 into the opposite position causing reversible electric motor 141 to reverse direction of rotation which causes drying duct 83 to reverse direction of movement and move back up first I beam 80.

The operation of the washer and drier will now be described. First, reversible electric motor 141 is energized. Reversible electric motor 141 drives shaft 106 and attached first drive sprocket 126 and second drive sprocket (not shown) causing first drive sprocket 126 and second drive sprocket (not shown) to move along first drive chain 127 and second drive chain 136, respectively. First grooved roller 107 and second grooved roller 110 roll along first I beam inside top edge 112 and second I beam inside top edge 113 respectively. As the reversible electric motor 141 is started, fluid is supplied under pressure to first flexible hose 165 and second flexible hose 166 causing washing fluid to come out nozzles 167 and form a spray curtain that impinges substantially normal and close to the surfaces of vehicle 82. As the drying duct 83 and spray pipe 160 move along toward first I beam first end 129 and second I beam first end 137 and start to lower when going around the curves of first I beam 80 and second I beam 81 first flexible strand 170 and second flexible strand 174 become taut and hold up first elbow 161 and second elbow 163 and prevent first elbow 161 and second elbow 163 from dragging on surface 79. When first drying duct corner 115 reaches first I beam first end 129, first switching rod 180 flips reversing switch 179 into the opposite position, causing reversible electric motor 141 to reverse direction of rotation and move the drying duct 83 and spray curtain back up first I beam 80 and second I beam 81. The drying duct 83 and spray curtain move toward first I beam second end 130 and second I beam second end (not shown) with the first flexible strand 170 and second flexible strand 174 becoming taut in time to prevent first elbow 161 and second elbow 163 from dragging on surface 79. As first drying duct corner 115 reaches first I beam second end 130 reversing switch 179 is flipped into the opposite position causing the reversible electric motor 141 to again reverse direction and move the drying duct 83 and spray curtain back up first I beam 80 and second I beam 81. When the spray curtain and drying duct 83 reach the center of first I beam 80 and second I beam 81 one cycle is completed. Thus, it can be seen that the spray curtain will substantially follow the contour of the surfaces of the vehicle 82 and will impinge close to and substantially normal to the surfaces of the vehicle 82. Any desired combination of cycles could be used. For example a complete wash and dry could be two cycles using detergent wash water for cleaning, followed by two cycles using clear rinse water and followed by two cycles in which the fluid is cut off to first flexible hose 165 and second flexible hose 166 and first fan 88 and second fan 89 are energized to provide a drying curtain of air to the surfaces of the vehicle 82.

The invention in its broader aspects is not limited to the specific apparatus shown and described but departures may be made therefrom within the scope of the accompanying claims without departing from the principles of the invention and without sacrificing its chief advantages.

I claim:
1. A vehicle washer which comprises:
   (a) a first arcuate beam having an inside edge and a second arcuate beam having an inside edge mounted on a surface and defining a vehicle washing position and having contours substantially the same as the contours of the top surfaces of the vehicle to be washed;
   (b) a movable, inverted U-shaped spray unit;
   (c) a shaft rotatably mounted on the spray unit top;
   (d) a first roller having a first groove rotatably mounted on the shaft so that the first groove rests and can roll on the first arcuate beam inside edge and a second roller having a second groove rotatably mounted on the shaft so that the second groove rests and can roll on the second arcuate beam inside edge;
(e) a first drive sprocket rigidly mounted to the first shaft end and a second drive sprocket rigidly mounted to the second shaft end;
(f) a first plurality of idler sprockets rotatably mounted to the spray unit substantially adjacent the first spray unit corner and a second plurality of idler sprockets rotatably mounted to the spray unit substantially adjacent the second spray unit corner;
(g) a first drive chain resiliently connected to the first arcuate beam first end and first arcuate beam second end and lying on the first arcuate beam and operatively connected and interwoven through the first plurality of idler sprockets and first sprocket so that the first plurality of idler sprockets hold the first drive chain in operative engagement with the first drive sprocket;
(h) a second drive chain resiliently connected to the second arcuate beam first end and second arcuate beam second end and lying on the second arcuate beam and operatively connected and interwoven through the second plurality of idler sprockets and second drive sprocket so that the second plurality of idler sprockets hold the second drive chain in operative engagement with the second drive sprocket;
(i) a reversible drive motor mounted to the spray unit top;
(j) drive connection means operatively connecting the reversible drive motor and the shaft so that rotation of the reversible drive motor cauuses the first drive sprocket and second drive sprocket to travel back and forth along the first drive chain and second drive chain causing the spray unit top to follow the contour of the first arcuate beam and second arcuate beam as the reversible drive motor rotates in either direction;
(k) strand means connected to and between the first arcuate beam and first spray unit leg and to and between the second arcuate beam and second spray unit leg for preventing the first spray unit leg and second spray unit leg from dragging on the surface as the spray unit moves down around the curves of the first arcuate beam and second arcuate beam.

2. A vehicle washer which comprises:
(a) a first arcuate beam having an inside edge and a second arcuate beam having an inside edge mounted on a surface and defining a vehicle washing position and having contours substantially the same as the contours of the top surfaces of the vehicle to be washed;
(b) a movable, inverted U-shaped spray unit;
(c) a shaft rotatably mounted on the spray unit top;
(d) a first roller having a first groove rotatably mounted on the shaft so that the first groove rests and can roll on the first arcuate beam inside edge and a second roller having a second groove rotatably mounted on the shaft so that the second groove rests and can roll on the second arcuate beam inside edge;
(e) a first drive sprocket rigidly mounted to the first shaft end and a second drive sprocket rigidly mounted to the second shaft end;
(f) a first idler sprocket, second idler sprocket, third idler sprocket, and fourth idler sprocket rotatably mounted to the spray unit substantially adjacent the first spray unit corner and substantially defining the corners of an isosceles trapezoid with the first drive sprocket lying between the first idler sprocket and fourth idler sprocket;
(g) a fifth idler sprocket, sixth idler sprocket, seventh idler sprocket, and eighth idler sprocket rotatably mounted to the spray unit substantially adjacent the second spray unit corner and substantially defining the corners of an isosceles trapezoid with the second drive sprocket lying between the fifth idler sprocket and eighth idler sprocket;
(h) a first drive chain resiliently connected to the first arcuate beam first end and first arcuate beam second end and lying on the first arcuate beam and interwoven in operative engagement under the first idler sprocket, over and around the second idler sprocket, under and around the first drive sprocket, over and around the third idler sprocket, and under and around the fourth idler sprocket so that the first drive chain is held in operative engagement with the first drive sprocket;
(i) a second drive chain resiliently connected to the second arcuate beam first end and second arcuate beam second end and lying on the second arcuate beam and interwoven in operative engagement under the fifth idler sprocket, over and around the sixth idler sprocket, under and around the second drive sprocket, over and around the seventh idler sprocket, and under and around the eighth idler sprocket so that the second drive chain is held in operative engagement with the second drive sprocket;
(j) a reversible drive motor mounted to the spray unit top;
(k) drive connection means operatively connecting the reversible drive motor and the shaft so that rotation of the reversible drive motor causes the first drive sprocket and second drive sprocket to travel back and forth along the first drive chain and second drive chain causing the spray unit top to follow the contour of the first arcuate beam and second arcuate beam as the reversible drive motor rotates in either direction;
(l) a first strand connected at the first strand first end to substantially the first arcuate beam middle and connected at the first strand second end to the first spray unit leg end and a second strand connected at the second strand first end to substantially the second arcuate beam middle and at the second strand second end to the second spray unit leg end, the first strand and second strand being short enough to prevent the first spray unit leg end and second spray unit leg end from dragging on the surface as the spray unit moves down around the curves of the first arcuate beam and second arcuate beam.

3. A vehicle washer which comprises:
(a) a first arcuate I beam and a second arcuate I beam mounted on a surface and defining a vehicle washing position and having contours substantially the same as the contours of the top surfaces of the vehicle to be washed;
(b) a movable inverted U-shaped frame;
(c) an inverted U-shaped spray pipe mounted to the frame;
(d) a plurality of spaced spray nozzles operatively mounted to the spray pipe so that liquid forced through the nozzles forms a spray curtain that impinges substantially normal on the vehicle surfaces of the vehicle to be washed;
(e) at least a first bearing and second bearing mounted to the frame top;
(f) a shaft rotatably mounted in the first bearing and second bearing;
(g) a first roller having a first groove rotatably mounted to the shaft so that the first groove rests and can roll on the first I beam inside top edge and a second roller having a second groove rotatably mounted to the shaft so that the second groove rests and can roll on the second I beam inside top edge;
(h) a first drive sprocket rigidly mounted to the first shaft end and a second drive sprocket rigidly mounted to the second shaft end;
(i) a first idler sprocket, second idler sprocket, third idler sprocket and fourth idler sprocket rotatably mounted to the frame substantially adjacent the first frame corner and substantially defining the corners of an isosceles trapezoid with the first drive sprocket lying between the first idler sprocket and fourth idler sprocket;
(j) a fifth idler sprocket, sixth idler sprocket, seventh idler sprocket and eighth idler sprocket rotatably mounted to the frame substantially adjacent the second frame corner and substantially defining the corners of an isosceles trapezoid with the second drive shaft lying between the fifth idler sprocket and eighth idler sprocket;
(k) a first drive chain resiliently connected to the first I beam first end and first I beam second end and lying on the first I beam web and interwoven in operative engagement under the first idler sprocket, over and around the second idler sprocket, under and around the first drive sprocket, over and around the third idler sprocket, and under and around the fourth idler sprocket so that the first drive chain is held in operative engagement with the first drive sprocket;
(l) a second drive chain resiliently connected to the second I beam first end and second I beam second end and lying on the second I beam web and interwoven in operative engagement under the fifth idler sprocket, over and around the sixth idler sprocket, under and around the second drive sprocket, over and around the seventh idler sprocket, and under and around the eighth idler sprocket so that the second drive chain is held in operative engagement with the second drive sprocket;
(m) a reversible, electric drive motor mounted to the frame top;
(n) drive connection means operatively connecting the reversible electric drive motor and the shaft so that rotation of the reversible electric drive motor causes the first drive sprocket and second drive sprocket to travel back and forth along the first drive chain and second drive chain causing the spray pipe top to follow the contour of the first arcuate I beam and second arcuate I beam as the reversible electric drive motor rotates in either direction;
(o) a first strand connected at the first strand first end to the first arcuate I beam middle and connected at the first strand second end to the first spray pipe leg end and a second strand connected at the second strand first end to substantially the second arcuate I beam middle and at the second strand second end to the second spray pipe leg end, the first strand and second strand being short enough to prevent the first spray pipe leg end and second spray pipe leg end from dragging on the surface as the spray pipe and frame move down around the curves of the first arcuate I beam and second arcuate I beam;
(p) reversible, electric drive motor reversing means including a first switching rod mounted to the first arcuate I beam first end and a second switching rod mounted to the first arcuate I beam second end for flipping a reversing switch mounted on the frame into opposite positions as the frame reaches the first switching rod and second switching rod for reversing the reversible electric drive motor.

4. A vehicle washer and drier which comprises:
(a) a first arcuate beam having an inside edge and a second arcuate beam having an inside edge mounted on a surface and defining a vehicle washing and drying position and having contours substantially the same as the contours of the top surfaces of the vehicle to be washed and dried;
(b) a movable, inverted U-shaped washer and drier unit;
(c) a shaft rotatably mounted on the washer and drier unit top;
(d) a first roller having a first groove rotatably mounted on the shaft so that the first groove rests and can roll on first arcuate beam inside edge and a second roller having a second groove rotatably mounted on the shaft so that the second groove rests and can roll on the second arcuate beam inside edge;
(e) a first drive sprocket rigidly mounted to the first shaft end and a second drive sprocket rigidly mounted to the second shaft end;
(f) a first plurality of idler sprockets rotatably mounted to the washer and drier unit substantially adjacent the first washer and drier unit corner and a second plurality of idler sprockets rotatably mounted to the washer and drier unit substantially adjacent the second washer and drier unit corner;
(g) a first drive chain resiliently connected to the first arcuate beam first end and first arcuate beam second end and lying on the first arcuate beam and operatively connected and interwoven through the first plurality of idler sprockets and first drive sprocket so that the first plurality of idler sprockets hold the first drive chain in operative engagement with the first drive sprocket;
(h) a second drive chain resiliently connected to the second arcuate beam first end and second arcuate beam second end and lying on the second arcuate beam and operatively connected and interwoven through the second plurality of idler sprockets and second drive sprocket so that the second plurality of idler sprockets hold the second drive chain in operative engagement with the second drive sprocket;
(i) a reversible drive motor mounted to the washer and drier unit top;
(j) drive connection means operatively connecting the reversible drive motor and the shaft so that rotation of the reversible drive motor causes the first drive sprocket and second drive sprocket to travel back and forth along the first drive chain and second drive chain causing the washer and drier unit top to follow the contours of the first arcuate beam and second arcuate beam as the reversible drive motor rotates in either direction;
(k) strand means connected to and between the first arcuate beam and the first washer and drier unit leg and to and between the second arcuate beam and second washer and drier unit leg for preventing the first washer and drier unit leg and second washer and drier unit leg from dragging on the surface as the washer and drier unit moves down around the curves of the first arcuate beam and second arcuate beam.

5. A vehicle washer and drier which comprises:
(a) a first arcuate beam having an inside edge and a second arcuate beam having an inside edge mounted on a surface and defining a vehicle washing and drying position and having contours substantially the same as the contours of the top surfaces of the vehicle to be washed and dried;
(b) a movable, inverted, U-shaped, drying duct having an air outlet on the inside periphery for drying the vehicles and having a first motor driven fan operatively mounted to the first drying duct leg and a second motor driven fan operatively mounted to the second drying duct leg;
(c) an inverted, U-shaped, spray unit mounted to the drying duct;
(d) a shaft rotatably mounted on the drying duct top;
(e) a first roller having a first groove rotatably mounted on the shaft so that the first groove rests and can roll on the first arcuate beam inside edge and a second roller having a second groove rotatably mounted to the shaft so that the second groove rests and can roll on the second arcuate beam inside edge;
(f) a first drive sprocket rigidly mounted to the first shaft end and a second drive sprocket rigidly mounted to the second shaft end;
(g) a first idler sprocket, second idler sprocket, third idler sprocket and fourth idler sprocket rotatably mounted to the drying duct substantially adjacent the first drying duct corner and substantially defining the corners of an isosceles trapezoid with the first drive sprocket lying between the first idler sprocket and fourth idler sprocket;

(h) a fifth idler sprocket, sixth idler sprocket, seventh idler sprocket and eighth idler sprocket rotatably mounted to the drying duct substantially adjacent the second drying duct corner and substantially defining the corners of an isosceles trapezoid with the second drive sprocket lying between the fifth idler sprocket and eighth idler sprocket;

(i) a first drive chain resiliently connected to the first arcuate beam first end and first arcuate beam second end and lying on the first arcuate beam and interwoven in operative engagement under the first idler sprocket, over and around the second idler sprocket, under and around the first drive sprocket, over and around the third idler sprocket, and under and around the fourth idler sprocket so that the first drive chain is held in operative engagement with the first drive sprocket;

(j) a second drive chain resiliently connected to the second arcuate beam first end and second arcuate beam second end and lying on the second arcuate beam and interwoven in operative engagement under the fifth idler sprocket, over and around the sixth idler sprocket, under and around the second drive sprocket, over and around the seventh idler sprocket, and under and around the eighth idler sprocket so that the second drive chain is held in operative engagement with the second drive sprocket;

(k) a reversible drive motor mounted to the drying duct top;

(l) drive connection means operatively connecting the reversible drive motor and the shaft so that rotation of the reversible drive motor causes the first drive sprocket and second drive sprocket to travel back and forth along the first drive chain and second drive chain causing the spray unit top and drying duct top to follow the contour of the first arcuate beam and second arcuate beam as the reversible drive motor rotates in either direction;

(m) a first strand connected at the first strand first end to substantially the first arcuate beam middle and connected at the first strand second end to the first motor driven fan and a second strand connected at the second strand first end to substantially the second arcuate beam middle and at the second strand second end to the second motor driven fan, the first strand and second strand being short enough to prevent the spray unit first leg end and spray unit second leg end from dragging on the surface as the spray unit and drying duct move down around the curves of the first arcuate beam and second arcuate beam.

6. A vehicle washer and drier which comprises:

(a) a first arcuate I beam and a second arcuate I beam mounted on a surface and defining a vehicle washing and drying position and having contours substantially the same as the contours of the top surfaces of the vehicle to be washed and dried;

(b) a movable, inverted U-shaped drying duct having an air outlet on the inside periphery for drying the vehicle and having a first motor driven fan operatively mounted to the first drying duct leg and a second motor driven fan operatively mounted to the second drying duct leg;

(c) an inverted, U-shaped spray pipe mounted to the drying duct;

(d) a plurality of spaced spray nozzles operatively mounted to the spray pipe so that liquid forced through the spray nozzles forms a spray curtain that impinges substantially normal on the vehicle surfaces of the vehicle to be washed;

(e) at least a first bearing and second bearing mounted to the drying duct top;

(f) a shaft rotatably mounted in the first bearing and second bearing;

(g) a first roller having a first groove rotatably mounted on the shaft so that the first groove rests and can roll on the first arcuate I beam inside top edge and a second roller having a second groove rotatably mounted on the shaft so that the second groove rests and can roll on the second arcuate I beam inside top edge;

(h) a first drive sprocket rigidly mounted to the first shaft end and a second drive sprocket rigidly mounted to the second shaft end;

(i) a first idler sprocket, second idler sprocket, third idler sprocket and fourth idler sprocket rotatably mounted to the drying duct substantially adjacent the first drying duct corner and substantially defining the corner of an isosceles trapezoid with the first drive sprocket lying between the first idler sprocket and fourth idler sprocket;

(j) a fifth idler sprocket, sixth idler sprocket, seventh idler sprocket and eighth idler sprocket rotatably mounted to the drying duct substantially adjacent the second drying duct corner and substantially defining the corners of an isosceles trapezoid with the second drive sprocket lying between the fifth idler sprocket and eighth idler sprocket;

(k) a first drive chain resiliently connected to the first arcuate I beam first end and first arcuate I beam second end and lying on the first arcuate I beam and interwoven in operative engagement under the first idler sprocket, over and around the second idler sprocket, under and around the first drive sprocket, over and around the third idler sprocket, and under and around the fourth idler sprocket so that the first drive chain is held in operative engagement with the first drive sprocket;

(l) a second drive chain resiliently connected to the second arcuate I beam first end and second arcuate I beam second end and lying on the second arcuate I beam and interwoven in operative engagement under the fifth idler sprocket, over and around the sixth idler sprocket, under and around the second drive sprocket, over and around the seventh idler sprocket, and under and around the eighth idler sprocket, so that the second drive chain is held in operative engagement with the second drive sprocket;

(m) a reversible, electric drive motor mounted to the drying duct top;

(n) drive connection means operatively connecting the reversible electric drive motor and the shaft so that rotation of the reversible, electric drive motor causes the first drive sprocket and second drive sprocket to travel back and forth along the first drive chain and second drive chain causing the drying duct top and spray pipe top to follow the contour of the first arcuate I beam and second arcuate I beam as the reversible, electric drive motor rotates in either direction;

(o) a first strand connected at the first strand first end to substantially the first arcuate I beam middle and connected at the first strand second end to the first motor driven fan and a second strand connected at the second strand first end to substantially the second arcuate I beam middle and at the second strand second end to the second motor driven fan, the first strand and second strand being short enough to prevent the spray pipe first leg end and spray pipe second leg end from dragging on the surface as the spray pipe and drying duct move down around the curves of the first arcuate I beam and second arcuate I beam;

(p) reversible electric drive motor reversing means, including a first switching rod mounted to the first arcuate I beam first end and a second switching rod mounted to the first arcuate I beam seond end for flipping a reversing switch mounted on the drying duct into opposite positions as the drying duct reaches the first switching rod and second switching rod for reversing the reversible electric drive motor.

References Cited

UNITED STATES PATENTS

| | | | |
|---|---|---|---|
| 3,451,094 | 6/1969 | Kywi | 134—123X |
| 3,545,459 | 12/1970 | Phillips | 134—181X |

FOREIGN PATENTS

| | | | |
|---|---|---|---|
| 1,464,763 | 11/1966 | France | 134—45 |

ROBERT L. BLEUTGE, Primary Examiner

U.S. Cl. X.R.

134—123, 181